Sept. 10, 1929.   B. ANDERSON   1,727,853
FILE
Filed Sept. 1, 1927
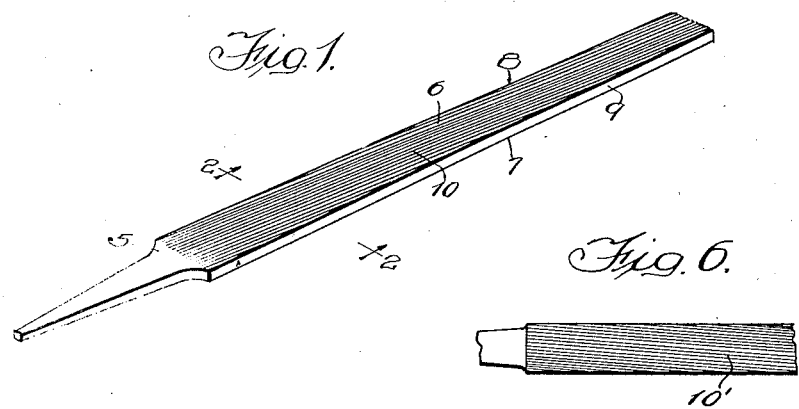
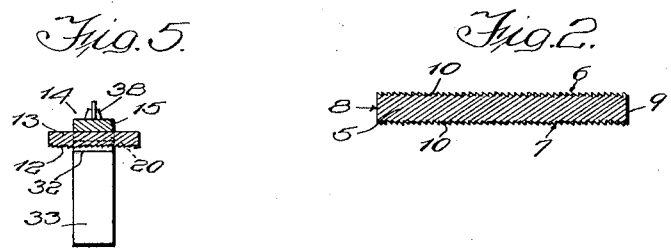
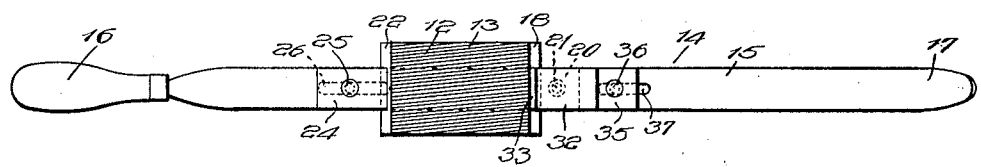
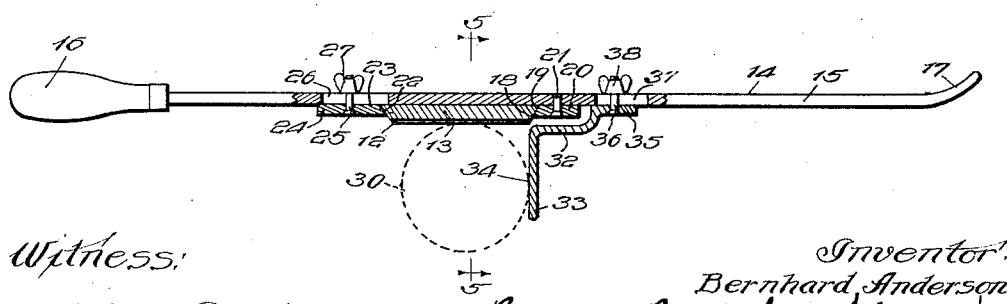
Witness:
William P. Kilroy
Inventor:
Bernhard Anderson
By Brown, Boettcher & Dienner
Attys Patented Sept. 10, 1929.

1,727,853

UNITED STATES PATENT OFFICE.

BERNHARD ANDERSON, OF CHICAGO, ILLINOIS.

FILE.

Application filed September 1, 1927. Serial No. 216,859.

My invention relates to filing tools and its object is the provision of a generally improved file that will shave, rather than chip off the material and which will operate faster and smoother, without gathering the material and which will not fill up with or burn the material which is removed.

The file of the present invention is particularly adapted for metal working and lathe work, but it is to be understood that the invention is not limited to a particular purpose, but it may be employed as and where desired.

The invention is illustrated in the accompanying drawings in which:

Fig. 1 is a perspective view of a file embodying the present invention;

Fig. 2 is an enlarged transverse section taken on the line 2—2 of Fig. 1;

Fig. 3 is a bottom view of another embodiment of the invention;

Fig. 4 is a side elevational view, partially in section, of the embodiment shown in Fig. 3;

Fig. 5 is a transverse section taken on the line 5—5 of Fig. 4; and

Fig. 6 is a plan view of another embodiment.

Referring to the drawing the files shown in Figs. 1 and 2 are of the flat faced type comprising a suitable metal, usually steel, body 5 of generally rectangular section with the opposite generally or substantially parallel faces 6 and 7 and the opposite edges 8 and 9. The body 5 is usually of tapering width, as shown, although its width may be uniform and the particular shape and form of the body may be varied widely. The file as shown is commonly known as a cotter-file, when large, or a verge-file, when small, but it is to be understood that the showing is merely illustrative and the invention may be embodied in any other desired type of file. For example, in Fig. 6, the invention is shown as embodied in a round file, with the teeth 10′ disposed longitudinally.

According to the present invention the teeth 10 which may be provided in either one or both of the faces 6 and 7, extend longitudinally of the body 5 instead of transversely, thereacross, as before. These teeth may be formed in any suitable or preferred manner, as for example, by suitable die means or in a shaper or otherwise, as desired and they are disposed generally or substantially parallel the length or longitudinal dimension of the body 5, preferably inclined thereto, as shown, this inclination being preferably relatively slight and substantially as indicated or such as would be the equivalent thereof and produce substantially the same results. In the claims where I refer to generally or substantially longitudinal teeth I intend thereby to cover or include the longitudinal inclination shown and any equivalent inclination of the teeth.

I find that by forming the teeth in this manner the file will abrade or operate quicker and smoother and with less effort. I find that where the teeth are formed in this manner as distinguished from the transverse or oblique ridges or teeth, as now provided the file shaves, rather than chips off the material in operation. The oblique ridges or teeth now in use may be said to be inclined to the transverse dimension as distinguished from the slight longitudinal inclination of the present invention. With the lengthwise or longitudinal direction of the teeth 10 I find that the file does not gather or fill up with chips and that there is no such burning of the chips or work, such as now results where chips collect or gather and rub across the work in the operation of the file, due to the transverse direction of the teeth across the work rather than generally parallel with the same as in the present invention.

The teeth 10 may be shaped in cross section substantially as shown, or otherwise as desired and although shown in both faces 6 and 7 they may be formed in one face only with the other face blank or differently formed as desired. It is to be understood that the teeth may be cut or otherwise suitably formed in the body 5 and that the file may be tempered or otherwise treated in the usual or any suitable manner.

Although the file of the present invention is not limited to a particular use or purpose, I find that it has particular utility in metal working and lathe work. With the tooth formation described the file may be placed on the work in a lathe and moved crosswise and may operate on one place or one portion of the file without the lengthwise movement necessary with the cross toothed file now in use and under such conditions the file will produce a quicker and smoother finish without filling up or gathering the material which is removed.

In the embodiment shown in Figs. 3, 4 and 5 the teeth 12 again extend lengthwise or longitudinally of the file body 13 preferably with a relatively slight longitudinal inclination, as shown. In this case the file body 13 is relatively short and a holder designated generally at 14 is provided. The relatively short length of the body 13 facilitates the formation of the teeth 12, the section of which may be as before or otherwise as desired and any problem of making the longitudinal teeth substantially parallel over a relatively great length is avoided. The possibility of irregularities may be avoided and the desired formation of the teeth may be provided in the previous embodiment of the invention.

The holder 14 comprises a blade 15 which may be of steel or other suitable metal, provided at one end with a handle 16 and curved back at its opposite end at 17 to be readily grasped. One end of the relatively short file body 13 is beveled or inclined at 18 for interlocking engagement with the complementary inclined end 19 of a strip or clamping piece 20 riveted or otherwise rigidly attached at 21 to the blade 15. The opposite end of the file body 15 is beveled or inclined at 22 for interlocking engagement with the complementary inclined end 23 of a clamping piece 24 which has a stud 25 passing through a longitudinally elongated slot 26 in the blade 15 with a finger or wing nut 27 threaded upon the stud 26 upon the opposite side of the blade 15. The nuts 27 may be conveniently clamped with the finger and by loosening it the clamping piece 24 is slidable to release the file 13 for removal. When the file is replaced the nut 27 is released and the piece 24 moved to receive the file between it and the stationary clamping piece 20 whereupon the beveled end 23 of the piece 24 is moved into engagement with the beveled end 22 of the file body 13 and the nut 27 is tightened firmly and rigidly binding the file in place upon the blade 15.

For holding the file in place upon rotating lathe work designated, more or less illustratively, in dotted lines at 30 the blade 15 may be provided with a stop 32. The stop 32 shown is of angular formation with a leg 33 adapted to cooperate with or engage the work at 34 to hold the file in position thereon. The other leg 35 of the stop 32 has a stud 36 which passes through the longitudinally elongated slot 37 in the blade 15 with a wing or finger nut 38 threaded upon the stud 36 upon the opposite side of the blade 15. By loosening the nut 38 the stop may be adjusted longitudinally of the holder to change the place of operation of the file on the work, that is a fresh portion of the cutting surface of the file may be thereby brought into position for cooperation with the work and by tightening the nut 38 the stop 32 may be again firmly and rigidly secured in place.

Where I refer in the claims to the teeth of the file extending generally parallel with the opposite sides I mean thereby the extension in the general direction of the sides and between the ends of the bar without the extension from one side to the other as heretofore. Such relatively slight angular disposition to these sides as shown and any equivalent thereof are intended to be included within this terminology so long as the teeth extend in the general direction of the sides and from one end to the other without extending between the sides.

I claim:

1. As an article of manufacture a file comprising a body having a working surface and operable by longitudinal movement relative said surface and teeth formed in said surface and extending generally longitudinally of the file body at such an angle that said teeth extend from one end of the working surface to the opposite end of said surface generally parallel with the opposite longitudinal sides of said working surface and without extending between the sides of said surface.

2. As an article of manufacture a file comprising a body having a working surface and teeth formed in said surface and inclined slightly to the longitudinal dimension of the file, said file being operable by longitudinal movement relative said surface and said teeth being at such an angle as to extend from one end of the working surface to the opposite end of said surface generally parallel with the opposite longitudinal sides of said working surface and without extending between the sides of said surface.

3. In combination, a file holder, a relatively short file carried thereby and teeth in said file and extending generally longitudinally of said holder, said teeth extending from one end of the file to the opposite end generally parallel with the opposite sides of the file and without extending from one side of the file to the opposite side.

In witness whereof, I hereunto subscribe my name this 24th day of August, 1927.

BERNHARD ANDERSON.